May 27, 1930.

LE ROY SMELKER

AUTOMOBILE SEAT AND THE LIKE

Re. 17,680

Original Filed July 14, 1926

INVENTOR.

LeRoy Smelker

BY

ATTORNEY.

Reissued May 27, 1930 Re. 17,680

UNITED STATES PATENT OFFICE

LE ROY SMELKER, OF DAYTON, OHIO

AUTOMOBILE SEAT AND THE LIKE

Original No. 1,682,989, dated September 4, 1928, Serial No. 122,321, filed July 14, 1926. Application for reissue filed December 30, 1929. Serial No. 417,578.

This invention relates to improvements in automobile seats, having particular reference to rotatable single seats arranged to facilitate the entrance of a person into an automobile, or facilitate their exit therefrom.

The improved seats are particularly adaptable for the coach type of automobile in which only one door is used on a side, entrance to the rear seat being attained by rotating the side front seat to open a passage between the seat and the side of the car, thus making it possible for others to pass to or leave the car from the rear seat when the front side seat is occupied merely by the occupant of the front seat moving with the seat rotatably. When the front side seat is unoccupied the passage to the rear seat is opened in like manner by rotating the side seat.

The present invention differs from the construction set forth in my copending application herein referred to in structural features and in operating independently of the door. The improved seat as herein set forth has been simplified and cheapened for production in quantities the same being adapted and having merit as standard construction for any make of automobile of the coach type or any type of automobile in which separate front seats are used.

The invention is illustrated in its preferred form in the accompanying drawings in which.

Figure 1:
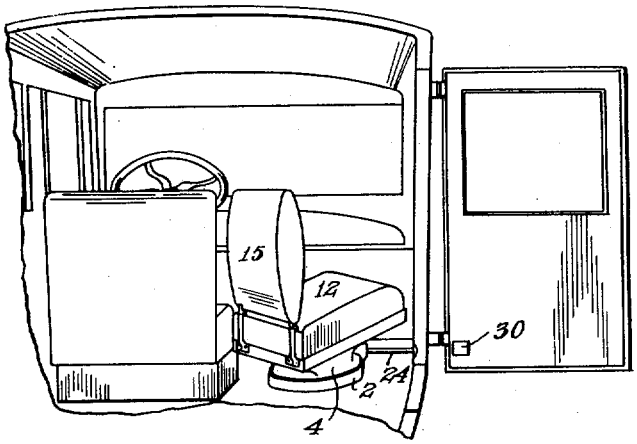
Fig. 1 is a sectional view in elevation of the front end of an automobile coach, looking toward the front of the car with the improved seat turned at an angle.

The improved seat, as here shown, relates entirely to the rotatable base construction of the front side seat of the coach, consisting of the floor base 1 which is concaved on its lower face thus presenting a rim or annular flange 2 upon the edge of which the base rests on the floor of the car. Opposite widely spaced bearing arms 3 are formed integrally with base 1 and are pivoted at their front ends in brackets 4 secured to the floor of the car, the connection between the brackets and arms 3 being effected by means of sleeve bearings 5. Thus the seat as a whole is adapted to be turned forward in the manner common to front side seats of this character.

Figure 3:
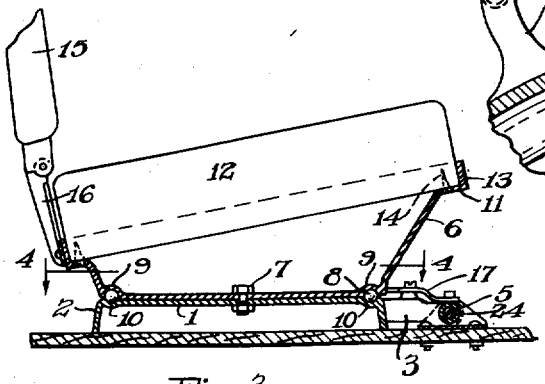
Fig. 3 is a view in side elevation of the rotatable seat showing the base of the seat in section.

Supported rotatably on the floor base 1 is a one piece seat base 6, the two bases being assembled one with the other by a bolt 7 about which the upper base is free to rotate. A ball bearing 8 is interposed between bases 1—6, the bearing race being formed by annular grooves 9—10 formed in the upper and lower bases respectively near their coacting outer edges as best shown in Fig. 3, thus acting to minimize friction in the bearing.

The upturned wall of base 6 is higher at the front than at the rear, the inclination of the wall to the rear serving to give the desired angle to the seat. The upper portion of the base is shaped into a shoulder or ledge 11 which serves as a seat for the cushion 12 and a flange 13 which acts to retain the cushion, the under frame structure of the cushion being secured to the base by screws 14. The back 15 is standard construction except as to fastening the hinge bracket to the flange of base 6.

Figure 4:
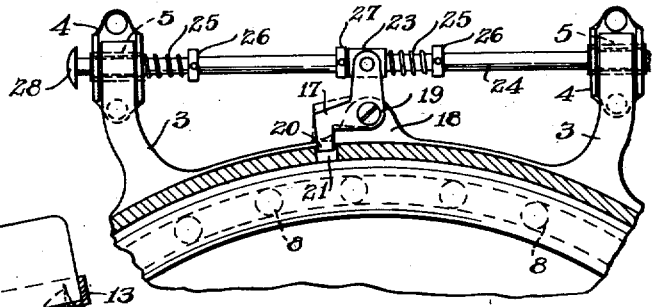
Fig. 4 is a detail view of the base of the seat partially in section.

Provision is made, as best shown in Fig. 4, for latching the seat in its normal position, also when the seat is turned a half turn to face the rear seat thus to prevent rotatable movement of the seat in either position when the car is in travel. The seat latching mechanism consists of a latch member 17 pivoted on a forward extension 18 of base 1 as at 19, the finger 20 of the latch coacting with notches 21—22 in base 6 to retain the seat in its two positions accordingly as the occupant of the seat may wish to face forward, or rearward.

Figure 5:
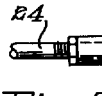
Fig. 5 is a view of a detail of the seat latching mechanism.

The opposite end of pawl 17 is connected pivotally to a sleeve 23 slidable on a push rod 24 having slidable bearing supports in the sleeves 5 and spring tensioned toward the door adjacent the rotatable seat by springs 25. One of the springs is compressed between one of the bearing sleeves 5 and a collar 26, and the other spring between the sleeve 23 and another collar 26, both collars 26 being pinned to the push rod 24. A third collar 27 butts against the opposite end of sleeve 23 thus acting when the push rod is moved axially under the spring tension toward the door, when the door is opened, to move pawl 17 on its pivot, disengaging base 6, the seat being then free to rotate. The inner end of the push rod is provided with a head 28 to limit the movement of the rod. The outer end of the rod is threaded as indicated in Fig. 5 and is provided with an axially extendible head 29 adapted to butt against the adjacent door of the car when the door is closed, the door being provided as shown in Fig. 1 with a plate 30 to engage the head 29. When the door is closed rod 24 is pushed inward thus acting yieldingly through spring 25 and collar 26 coacting with the pawl to cause the pawl to engage notch 21, when the seat is turned forward, or notch 22 when the seat is turned rearward, the position of the parts being then as illustrated in Fig. 4. When the door is opened springs 25 act to move the rod in the opposite direction and thus to disengage pawl 17, the seat being then free to turn. The arrangement of the spring 25 coacting with sleeve 23 and collars 26—27 is such that the latch 17 will not be jambed if the door is closed when the seat is turned at an angle, the latch being then out of engagement with the notches 21—22, compensation for the abnormal relation of the parts being provided by the springs 25.

Figure 2:
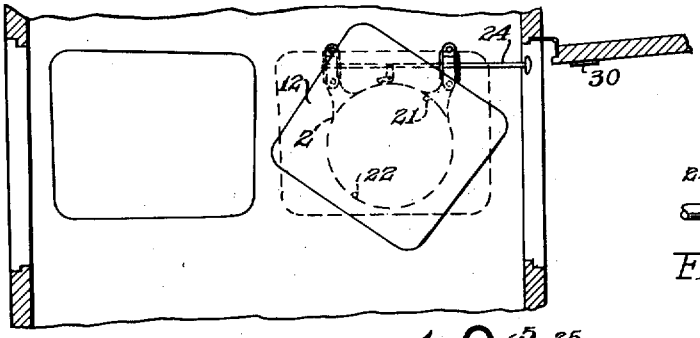
Fig. 2 is a diagrammatic view of the front seats illustrating the different positions of the rotatable seat.

It will be observed in Figs. 1 and 2 that ample space is provided for entrance to the rear of the car when the side seat is turned as indicated. When the seat is occupied the occupant turns with the seat moving the body to present the seat at the required angle to open the passage.

Both the function and structural merits of the invention will be readily apparent to those familiar with the seat and door arrangements of automobile coaches. The few and simple parts adapt the invention for low cost production and the substantial construction, ease of operation and effective control of the mechanism insures its normal operation under the conditions of use. The main parts are designed for production from sheet metal from dies to obtain maximum strength with minimum weight, neatness of appearance and production at the lowest possible cost.

Having described my invention, I claim:

1. A rotatable seat for an automobile comprising a base concaved on its under side, supported on the floor of the car and presenting a bearing face upwardly, a base concaved upwardly presenting a bearing face to the bearing face of the floor base, rotatable thereon, and having an upwardly extended wall including a circumferentially arranged shoulder and flange acting respectively for supporting and retaining the seat cushion.

2. A rotatable seat for an automobile comprising a base concaved on its under side, supported on the floor of the car and presenting a bearing face upwardly, a base concaved upwardly presenting a bearing face to the bearing face of the floor base, rotatable thereon, and having an upwardly extended wall including a circumferentially arranged shoulder and flange acting respectively for supporting and retaining the seat cushion, and coacting annular ball bearing grooves formed in the opposite bearing faces of said bases.

3. A rotatable seat for an automobile comprising a base concaved on its under side, supported on the floor of the car and presenting a bearing face upwardly, a base concaved upwardly presenting a bearing face to the bearing face of the floor base, rotatable thereon, and having an upwardly extended, outwardly flared wall, tapered rearwardly and including a seating ledge and peripheral retaining flange for the seat cushion.

4. A rotatable seat for an automobile comprising an inverted convexo-concave base, pivoted on the floor of the car and adapted to be tilted forward thereon and presenting a bearing face upward, a convexo-concave base presenting a bearing face to the bearing face of the floor base, secured rotatably thereon, and having an upwardly extended, outwardly flared wall including a rearwardly inclined seat ledge and an upwardly extended peripheral retaining flange for the seat cushion.

5. A rotatable seat for an automobile comprising a support base having an upwardly presented bearing face and a peripheral extension wall extending downwardly a short distance therefrom for engagement at the lower end thereof with the automobile floor, a seat supporting base rotatably supported thereon having a downwardly presented bearing face cooperating with the bearing face of said support base and having an upwardly extending peripheral wall, and a seat attached to said seat supporting base.

6. A rotatable seat for an automobile comprising a support base pivotally connected to the automobile floor, having an upwardly presented bearing face and a peripheral extension wall integral therewith and extending downwardly therefrom to the automobile floor, a seat supporting base rotatably mounted thereon and having a downwardly presented bearing face cooperating with the bearing face of said support base, said seat supporting base having integral therewith an upwardly extending peripheral wall provided with a rearwardly extending shoulder portion, and a seat attached to said supporting base with the rear end of the seat resting upon said rearwardly extending shoulder portion.

7. A rotatable seat support for an automobile comprising a support base adapted to be pivotally connected to the automobile floor for upward and forward swinging movements and having an upwardly presented substantially horizontal continuous bearing face and a peripheral extension wall extending downwardly a short distance therefrom for engagement with the automobile floor, a seat supporting base pivotally connected thereto for swinging movements about a substantially vertical axis, said seat supporting base having a downwardly presented substantially horizontal bearing face and having an upwardly extending peripheral wall, the bearing face and the extension wall of the support base and the seat supporting base being constructed of sheet metal, and said bearing faces having cooperating bearing arcuate portions.

8. A rotatable seat for an automobile comprising a support base having a substantially horizontal thin metal portion providing an upwardly presented face and a peripheral extension wall extending downwardly a short uniform distance therefrom and resting on the automobile floor, a seat supporting base pivotally connected and rotatably supported thereon having a thin metal portion providing a downwardly presented face cooperating with the face of said support base and having an upwardly extending wall, and a seat attached to said upwardly extending wall.

9. A rotatable seat support for an automobile comprising a support base adapted to be pivotally connected to an automobile floor for upward and forward swinging movements and having an upwardly presented surface and a peripheral extension wall extending downwardly a short distance therefrom for engagement at the lower end thereof with the automobile floor, a seat supporting base rotatably supported thereon having a downwardly presented surface cooperating with the said surface of said support base and having an upwardly extending peripheral wall extending upwardly and adapted to be attached to an automobile seat cushion, the vertical height of the combined bases at the front of the seat support substantially exceeding the vertical height of the combined bases at the rear thereof, and a stud pivotally interconnecting said support base and said seat supporting base.

10. A rotatable seat support for an automobile comprising a sheet metal support base adapted to be pivotally connected to the automobile floor for upward and forward swinging movements and having an upwardly presented bearing surface and a peripheral extension wall integral therewith and extending downwardly a short distance therefrom for engagement at the lower end thereof with the automobile floor, a sheet metal seat supporting base rotatably supported thereon having a downwardly presented bearing surface cooperating with the bearing surface of said support base and having an upwardly extending peripheral wall integral therewith and extending a greater distance at the front than at the rear and adapted to be attached to an automobile seat cushion, and means pivotally interconnecting said support base and said seat supporting base.

In testimony whereof I hereto affix my signature.

LE ROY SMELKER.